(12) United States Patent
Nottke et al.

(10) Patent No.: US 9,777,391 B2
(45) Date of Patent: Oct. 3, 2017

(54) PURIFICATION METHODS AND SYSTEMS FOR CONTAMINATED LIQUIDS AND MINERAL SLURRIES

(71) Applicant: Chiral Research, Inc., Tucson, AZ (US)

(72) Inventors: Francis Anthony Nottke, Tucson, AZ (US); Randolph Edward Seligmann, Tucson, AZ (US)

(73) Assignee: Chiral Research, Inc., Tucson, AZ (US)

(*) Notice: Subject to any disclaimer, the term of this patent is extended or adjusted under 35 U.S.C. 154(b) by 162 days.

(21) Appl. No.: 14/271,087

(22) Filed: May 6, 2014

(65) Prior Publication Data

US 2014/0332406 A1 Nov. 13, 2014

Related U.S. Application Data

(60) Provisional application No. 61/821,145, filed on May 8, 2013.

(51) Int. Cl.
| | |
|---|---|
| *C02F 1/461* | (2006.01) |
| *C02F 1/467* | (2006.01) |
| *C25F 1/00* | (2006.01) |
| *C25F 7/00* | (2006.01) |
| *C02F 9/00* | (2006.01) |

(Continued)

(52) U.S. Cl.
CPC ............... *C25F 7/00* (2013.01); *C02F 9/00* (2013.01); *C25B 9/00* (2013.01); *C25B 15/02* (2013.01); *C02F 1/04* (2013.01); *C02F 1/302* (2013.01); *C02F 1/34* (2013.01); *C02F 1/36* (2013.01); *C02F 1/4672* (2013.01); *C02F 1/4676* (2013.01); *Y02W 10/37* (2015.05)

(58) Field of Classification Search
CPC .................................. C25B 9/00; Y02W 10/37
See application file for complete search history.

(56) References Cited

U.S. PATENT DOCUMENTS

| | | |
|---|---|---|
| 6,596,178 B1 | 7/2003 | Archibald et al. |
| 2006/0060464 A1 | 3/2006 | Chang |

(Continued)

FOREIGN PATENT DOCUMENTS

WO 2014182715 11/2014

OTHER PUBLICATIONS

PCT; International Search Report and Written Opinion dated Sep. 9, 2014 in Application No. PCT/US2014/036993.

*Primary Examiner* — Kishor Mayekar
(74) *Attorney, Agent, or Firm* — Snell & Wilmer L.L.P.

(57) ABSTRACT

The present disclosure describes methods and systems comprising hydrodynamic cavitation, microwave irradiation, and at least one of oxidative sonoelectrolysis and reductive sonoelectrolysis, providing feedstock purification of at least one of water, fluid and mineral. Contaminants, broken down and chemically degraded into smaller and more volatile substances by hydrodynamic cavitation are ultimately destroyed in the course of one or more sonoelectrolysis steps. In various embodiments, at least one of oxidative sonoelectrolysis and reductive sonoelectrolysis is irradiated with microwaves in order to heat the sonoplasma present within acoustic cavitation bubbles to temperatures sufficient to destroy contaminants therein.

8 Claims, 5 Drawing Sheets

(51) Int. Cl.
  *C25B 15/02* (2006.01)
  *C25B 9/00* (2006.01)
  *C02F 1/04* (2006.01)
  *C02F 1/30* (2006.01)
  *C02F 1/34* (2006.01)
  *C02F 1/36* (2006.01)

(56) References Cited

U.S. PATENT DOCUMENTS

| | | |
|---|---|---|
| 2007/0175767 A1 | 8/2007 | Suzuki |
| 2008/0283411 A1* | 11/2008 | Eastman .................. C25B 15/08 205/343 |
| 2009/0145774 A1 | 6/2009 | Farooq et al. |
| 2010/0320147 A1 | 12/2010 | McGuire et al. |
| 2010/0320155 A1 | 12/2010 | Enos et al. |

* cited by examiner

PURIFICATION METHODS AND SYSTEMS FOR CONTAMINATED LIQUIDS AND MINERAL SLURRIES

CROSS-REFERENCE TO RELATED APPLICATION

This application claims priority to U.S. Provisional Patent Application Ser. No. 61/821,145, filed May 8, 2013, which is hereby incorporated by reference in its entirety.

FIELD OF THE INVENTION

The present disclosure relates generally to purification methods and in particular to methods and systems for the purification of water, fluids, minerals and compounds.

BACKGROUND OF THE INVENTION

Water pollution continues to be a global problem affecting world population. Water pollution may be the result of industry, mining, hydraulic fracturing, energy production and agriculture, amongst many other operations. The contaminants found in water polluted through these and other operations vary widely, including for example, metals, heavy metals, organic chemicals, inorganic compounds, biocides, and microorganisms.

There are countless devices, systems, companies and technologies that attempt to address water pollution through known purification technologies, including, distillation, ion exchange, carbon absorption filtration, ultra filtration, reverse osmosis, electro-deionization, treatment with various chemicals (e.g. ozone, chlorine), ultraviolet light, X-ray and Gamma-ray radiation, cavitation, and combination thereof. While each of these technologies can be capable of removing individual or several pollutants, no single method or combination of these methods can address numerous contaminants simultaneously. Furthermore, many methods are associated with some degree of environmental cost. For example, some methods separate off contaminants without destroying them, and some methods produce noxious by-products. Purification methods that only separate out pollutants, or create unsafe by-products in the process, only delay or offset the pollution problem rather than solving it.

Extraction and purification of metallic elements and metal compounds from ore, sand and deposits, continues to be energy and cost intensive. For example, separation of valuable elemental metals and compounds from ore can be so expensive to not be worth engaging in the mining operation at all. Particularly expensive and environmentally damaging is the electrolytic and/or thermal extraction and purification of gold (Au) from mineral ore, the purification of silicon (Si) from silicon dioxide (SiO2) and the separation of rare earth elements. Furthermore, purification processes used for water purification are not likely to be adaptable for the purification of metallic elements and metal-containing compounds from mineral ore, sand or deposits.

Therefore, in spite of the existence of these divergent processes for water remediation and mineral purification, the need exists for a single method and system usable to purify a broad range of feedstock, including water, fluid, elemental metals and metallic compounds.

SUMMARY OF THE INVENTION

The present invention encompasses purification methods comprising hydrodynamic cavitation, microwave irradiation, and at least one of oxidative sonoelectrolysis and reductive sonoelectrolysis. The nature, parameters, and sequential ordering of the purification steps that make up the methods of the present disclosure are suitably configured to optimize the chemical and/or mechanical breakdown of contaminants present in the material to be purified. In various embodiments of the methods disclosed herein, contaminants present in a material to be purified are broken down and chemically degraded into smaller and more volatile substances that are ultimately destroyed and/or more easily removed in the course of purification. In various embodiments, the methods further comprise at least one of filtration at or near the beginning of the method and distillation at or near the end of the method, depending on the material(s) to be purified. In various embodiments, the steps of hydrodynamic cavitation, microwave irradiation, and oxidative and/or reductive sonoelectrolysis can be separate and distinct operations within the methods. In various embodiments, microwave irradiation can be contemporaneous with at least one of oxidative sonoelectrolysis and reductive sonoelectrolysis. The present methods are adaptable for the flowstream purification of a feedstock comprising at least one of water, fluid, and mineral, wherein the mineral can be suspended in a liquid to produce a feedstock for use in the present method.

The present disclosure further comprises systems designed to purify various feedstock into product streams, wherein at least one material present in the feedstock and having a composition emerges from the system with a different composition in the product stream. In various embodiments, systems in accordance with the present disclosure comprise various purification devices, which are configured with the components necessary for the devices to provide the purification steps within the methods disclosed.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure, wherein.

DETAILED DESCRIPTION OF THE ILLUSTRATED EMBODIMENTS

Figure 1:
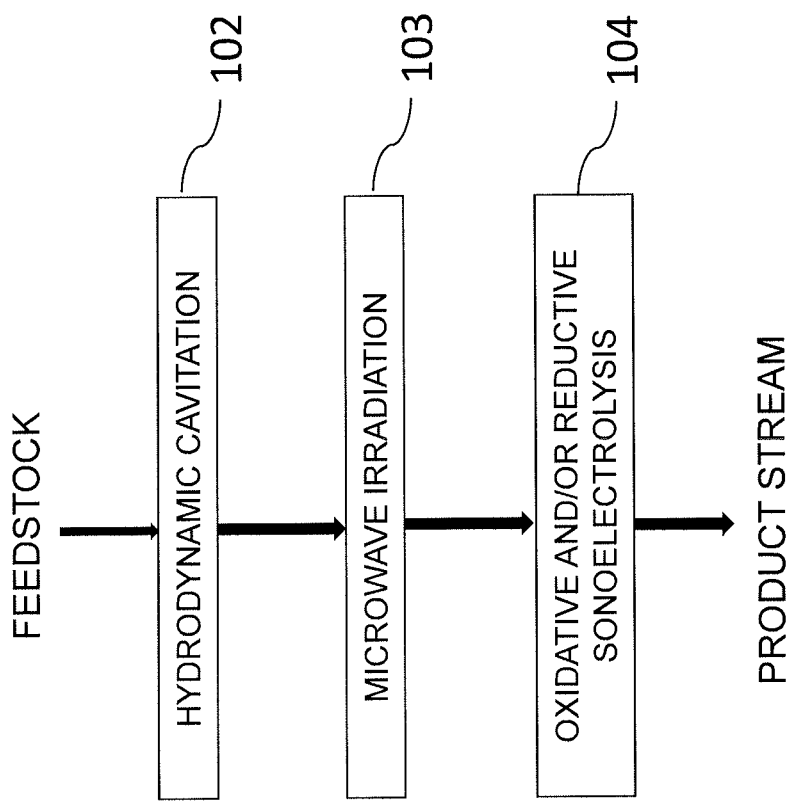
FIG. 1 is a flowchart depicting an embodiment of a purification method in accordance with the present disclosure.

Persons skilled in the art will readily appreciate that various aspects of the present disclosure can be realized by any number of methods and systems configured to perform the intended functions. Stated differently, other methods and systems can be incorporated herein to perform the intended functions. It should also be noted that the accompanying drawing figures referred to herein are not all drawn to scale, but can be exaggerated to illustrate various aspects of the present disclosure, and in that regard, the drawing figures should not be construed as limiting.

With that said, and as will be described in more detail herein, various embodiments of the present invention encompass purification methods comprising hydrodynamic cavitation, microwave irradiation, and at least one of oxidative sonoelectrolysis and reductive sonoelectrolysis. The nature, parameters, and sequential ordering of the purification steps that make up the purification methods of the present disclosure are suitably configured to optimize the chemical and/or mechanical breakdown of contaminants present in the material to be purified. In various embodiments of the purification methods disclosed herein, contaminants present in a material to be purified are broken down and chemically degraded into smaller and more volatile substances that are ultimately destroyed and/or more easily removed in the course of purification. In various embodiments, the method further comprises at least one of filtration at or near the beginning of the method and distillation at or near the end of the method, depending on the material to be purified. In various embodiments, the processes of hydrodynamic cavitation, microwave irradiation, and oxidative and/or reductive sonoelectrolysis are separate and distinct operations within the purification method. In various embodiments, microwave irradiation is contemporaneous with at least one of oxidative sonoelectrolysis and reductive sonoelectrolysis. Microwave irradiation can be used to heat the sonoplasma present inside acoustic cavitation bubbles to temperatures sufficient to change and/or destroy contaminants therein. The present purification methods are adaptable for the flowstream purification of a feedstock comprising at least one of water, fluid, and mineral, wherein the mineral can be suspended in a liquid to produce a feedstock for use in the present method. The present disclosure further comprises systems designed to purify various feedstock into product streams. In various embodiments, the systems of the present disclosure comprise components suitably configured to perform purification steps.

As used herein, the term "feedstock" refers to the flowable mixture entering the purification methods of the present disclosure, and comprising at least one material to be purified by such methods. The feedstock can comprise any percent solids (% solids) dissolved, and/or suspended, in a liquid carrier. The dissolved and/or suspended solids may comprise the contaminants to be removed from the liquid carrier, or the solids may comprise the material(s) to be purified. In this way, the feedstock can be a solution or suspension having any composition, turbidity, viscosity, and flow characteristics. The material(s) to be purified by the present methods can be a bulk liquid, e.g. water or solvent containing any undesirable dissolved and/or suspended, organic and inorganic compounds, and/or living and/or dead organisms. In other embodiments, the material(s) to be purified may be a solid, such as a mineral ore, sand, or other mineral deposit containing an element or a compound of interest. In these cases, the material(s) to be purified can be crushed and/or ground to a chosen particle size and suspended in a liquid carrier to form a flowable feedstock for the present methods. For example, a mineral ore to be purified to an elemental metal or an inorganic compound may be powdered and suspended in water to form a feedstock for use in the present methods.

As used herein, the term "flowstream" refers to the flowable mixture moving through the purification methods of the present disclosure. In various embodiments, the method comprises a flow process, meaning that the material to be purified continuously flows through the various stages of the method as a dynamic flowstream. In other embodiments, the flowable mixture may be temporarily held in one or more batch purification stages, e.g. in a vessel or chamber, and then released as a flowstream once the purification step is complete. The purification methods herein can comprise any combination of dynamic flow and static batch processes as needed for a particular feedstock. Flow may be produced by any means such as one or more pumps or by the action of gravity.

As used herein, the term "product stream" refers to purified material exiting from the purification methods of the present disclosure in any form such as a flowable liquid or slurry. Product stream may comprise, for example, purified liquid, e.g. potable water, or solid materials e.g. an elemental metal like Ag, Au, Cu, Al, Si, Ni, or any other commercial desirable metal, or any inorganic compound comprising a metal element.

As used herein, the term "purification" refers to a desired change in the compositional makeup of a material. Thus, purification may, for example, refer to a reduction in the percentage of one or more contaminants in contaminated water, or an increase in the percentage of a metallic element in a mineral ore, and so forth. Complete (100%) purification of an impure material is a goal, and for water, this equates to achieving pure, e.g. distilled water, that is entirely H2O with nothing else detectable therein. Similarly, complete purification of a mineral ore achieves pure metallic elements, such as Ag, Au, Cu, Al, Si, Ni, and the like, with no traces of other elements or compounds remaining from the starting ore. Known purification methods used for contaminated water achieve only about 60-80% purification. In various embodiments, the purification methods of the present invention are suitably configured to achieve at least 80% purification of a material. In various embodiments, the present purification methods achieve at least 90% purification of a material. In various embodiments, the present purification methods produce safe, drinkable water from water previously contaminated by industrial operations, mining operations, hydraulic fracturing operations, energy production, and agricultural operations.

Herein, "about" is used before a particular parameter to indicate that the parameter may vary as much as +/−10%. For example, if a voltage parameter is required to be "about 5 volts," then a voltage that varies from 4.5 V to 5.5 V is also usable. As another example, if an amperage of "about 0.1 mA" is stated as a limitation, then amperage of 0.09 mA to 0.11 mA falls within the limitation.

As used herein, "cavitation" means the isothermal formation of transient voids (i.e. cavities) in a liquid subjected to reduced pressure. These voids are comprised of vapor from the volatilized liquid, along with other vapors from materials present in the liquid, such as gasses and low molecular weight volatile compounds. The voids appear as spherical bubbles throughout the liquid. In inertial cavitation, the cavitation bubbles are transient, growing within regions of low pressure and violently collapsing upon movement into regions of increasing pressure. In non-inertial cavitation, the cavitation bubbles oscillate in size or shape. The mechanism of collapse of a cavitation bubble is characterized by a micro jet of liquid pulling into the bubble and colliding against the opposite inside surface of the bubble with supersonic force. The mechanism of bubble collapse can produce temperatures and pressures high enough within the collapsing bubble to break chemical bonds and cause chemical reactions. For example, hydroxyl radicals (.OH) capable of oxidizing compounds, can be produced within cavitation bubbles. Cavitation can arise in a liquid experiencing a pressure change over time and distance resulting from any number of processes. The pressure change may be the result of the dynamic flow of the liquid, (e.g. liquid flowing through a pipe having a section of reduced diameter), from the churning or shearing of the liquid, (e.g. with a propeller or other cavitation inducer), or from sonication (e.g. using an ultrasonic transducer), amongst other methods involving optics or particle bombardment. Although cavitation is an isothermal phenomenon (volatilization through localized pressure reduction rather than by heating), the liquid may be heated or cooled through external means during cavitation. For example, thermal or electromagnetic radiation can be used to initiate and/or accelerate vapor-phase chemical reactions inside cavitation bubbles. Additionally, cavitation can be adapted to continuous flow processes.

As used herein, "hydrodynamic cavitation" refers to cavitation in a liquid resulting from dynamic forces on the liquid, such as those forces occurring during flowing or shearing of the liquid. For purposes of the present disclosure, any device or apparatus configured to induce and/or facilitate hydrodynamic cavitation can be used. For example, in various embodiments, a propeller rotating in a liquid can cause hydrodynamic cavitation. In other embodiments, a liquid flowing through a constricted section of pipe, such as an orifice or venturi, can experience hydrodynamic cavitation. In other embodiments, hydrodynamic cavitation can be achieved by moving at least one multi-hole cavitation inducer in a liquid. For example, cavitation inducers may comprise orifice plates, perforated cones or cylinders, or other inducers that can be moved or rotated within a liquid. Cavitation inducers usable for hydrodynamic cavitation may be present in any number, combination, and configuration.

As used herein, "microwave irradiation" refers to the process of radiating electromagnetic (EM) waves onto/into a material, wherein the EM radiation has a wavelength from about 0.001 to about 1 meter, and power from about $1\times10^{-1}$ watts up to about $1\times10^{9}$ watts. Given the speed of light, microwave radiation has a frequency range from about 300 MHz to about 300 GHz. In various embodiments of the present disclosure, the source of microwave radiation may include any one of magnetrons, klystrons, traveling-wave tubes, gyrotrons, field-effect transistors, tunnel diodes, Gunn diodes or IMPATT diodes, or any other EM radiation source. The source(s) is/are selected as necessary to produce the desired effect in the material to be irradiated with the microwaves. Any single wavelength of incident radiation may be used, as well as any combination of wavelengths or ranges of wavelengths. In various embodiments, the entire microwave spectrum can be used. In various embodiments of the present method, a flowstream is subjected to microwave irradiation. Microwaves are known to cause rotation of dipoles in polar molecules, localized heating and acceleration of chemical reactions.

As used here, "acoustic cavitation" refers to cavitation of a liquid through sonication of the liquid with high intensity sound waves. The source of the sound waves may be from any type, and any number, of transducers or acoustic horns that can produce ultrasound intensities from about 0.10 watt/cm2 up to about 100 Kilowatts/cm2.

As used herein, the term "sonoelectrolysis" refers to acoustic cavitation in the presence of an electrical potential. For example, acoustic sonication of a flowstream in a pipe while a direct current (DC) is impressed on the pipe is a form of sonoelectrolysis. For use herein, sonoelectrolysis may be oxidative or reductive depending on the polarity of the electrical potential, the nature and number of electrodes, and the presence, if any, of reductive or oxidative reactants generated in, or added to, the flowstream. For example, a section of metal pipeline may be positive (+) or negative (−) in reference to another section of pipeline or to a sacrificial electrode separate from the pipeline. In the case of plastic piping, a strip of metal acting as an electrode can be placed inside the pipe and charged with an electrical potential. A pipeline or sonication chamber may include at least one electrode acting as, for example, an anode, cathode, reference electrode, auxiliary electrode, sacrificial electrode, or working electrode. Such electrodes may be immersed in the flowstream flowing through a pipeline, or into a material temporarily contained within a chamber. In various embodiments, working current density for sonoelectrolysis may be from about 1 mA/cm2 to about 100 A/cm2. In various embodiments, a voltage from about 0.01 volts to about 100 volts, and a current from about 1 mA to about 100 Amps, may be applied.

As used herein, the term "oxidative sonoelectrolysis" refers to acoustic cavitation contemporaneous with oxidizing electrolysis, optionally with added oxidants such as oxygen, ozone, or various peroxides. Oxidation reactions can be achieved by using one or more suitably configured electrodes that induce and/or facilitate oxidation reactions. For example, hydroxyl radicals may be generated from a boron-doped diamond (BDD) electrode, amongst other electrodes. In various embodiments, a metal can function as the anodic site for oxidation.

As used herein, the term "reductive sonoelectrolysis" refers to acoustic cavitation contemporaneous with reductive electrolysis, optionally with added reducing agents such as sulfites, CO, or H2. Reductive reactions can be achieved by using one or more suitably configured electrodes that induce and/or facilitate reduction reactions. For example, electrons (e−) capable of reducing various chlorinated compounds can be generated from graphite, glassy carbon, and other electrodes. In various embodiments, a metal can function as the cathodic site for reduction.

With the above being noted, and with reference now to FIG. 1, an exemplary embodiment of the purification method of the present disclosure is illustrated diagrammatically. As shown in FIG. 1, the purification method can comprise hydrodynamic cavitation 102, microwave irradiation 103, and at least one of oxidative sonoelectrolysis and reductive sonoelectrolysis 104, each as defined herein above and disclosed in more detail below. The method of FIG. 1 can be used to convert a feedstock to a product stream of different composition by action of the various purification steps on the material(s) to be purified in the feedstock. The purification steps may be in any order in addition to the order shown in FIG. 1, and any one step may be repeated as many times needed to achieve a particular intermediate result before the flowstream is allowed to move to the next step. Additionally, two or more steps may act contemporaneously on material(s) to be purified. In various embodiments, other purification steps, such as filtration and distillation, can be included for a particular feedstock or desired result. In various embodiments, only one of oxidative and reductive sonoelectrolysis may be included in the methods. In other embodiments, both oxidative and reductive sonoelectrolysis may be included in the methods. In the instances where both acoustic cavitation steps are present, they may be sequential in time and in either order in the method. As discussed above, a feedstock for use in the present methods comprises at least one material to be purified, and the product stream comprises purified material(s). In an exemplary embodiment, the feedstock comprises contaminated water and the product stream comprises potable water. In other embodiments, the feedstock comprises crushed mineral ore suspended in water and the product stream comprises a purified metal such as, for example, copper (Cu), gold (Au), silver (Ag), nickel (Ni), and the like, or any other desired element.

With continued reference to FIG. 1, the hydrodynamic cavitation 102 can be optimized to shear and break up large molecules and organisms. For example, proteins, fats, waxes, greases, oils, hydrocarbons, bacteria, other living and dead matter, and the like, can be converted to smaller molecular weight units. The hydrodynamic cavitation 102 can be repeated as many times as necessary until sufficient breakdown of the material(s) to be removed in the method is achieved. For example, a flowstream comprising a material to be purified may be subjected to hydrodynamic cavitation as many times as necessary for the desired result. One or more valves may be utilized for this purpose. In various embodiments, unwanted contaminants may be centrifugally separated in the procedure and continuously removed. In other embodiments, unwanted contaminants, broken down in the hydrodynamic cavitation step, are sent along to the next step in the method for further destruction and/or removal.

Figure 2:
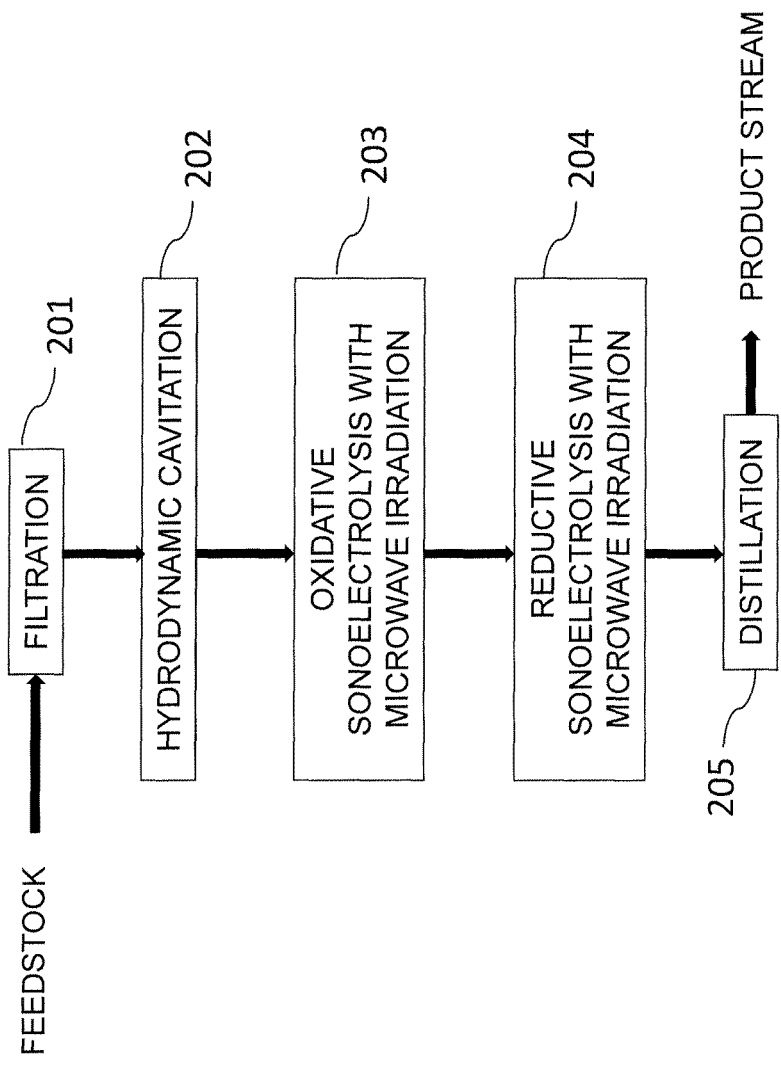
FIG. 2 is a flowchart depicting another embodiment of a purification method in accordance with the present disclosure.
Figure 3:
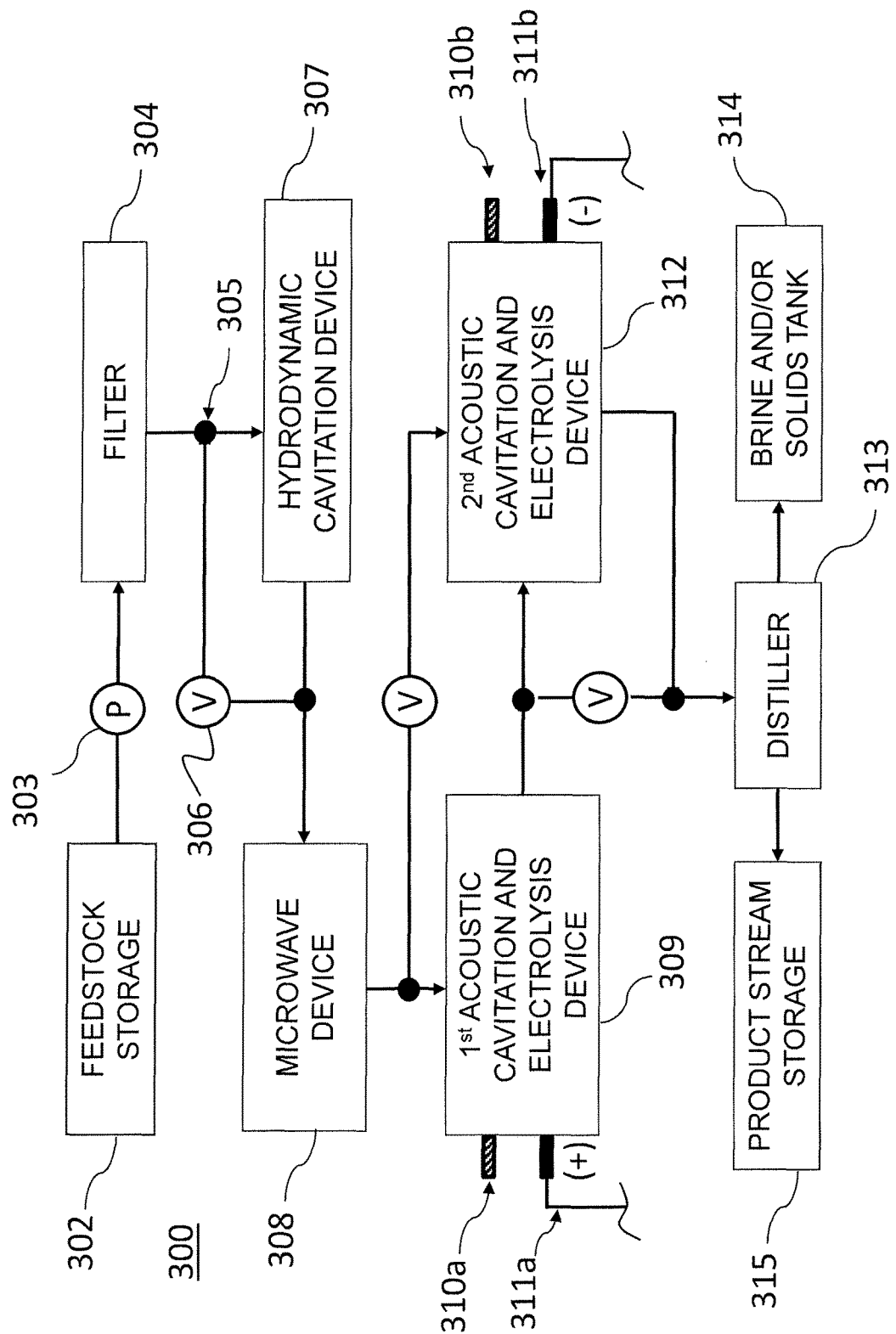
FIG. 3 illustrates an embodiment of a purification system in accordance with the present disclosure.

The hydrodynamic cavitation 102 in FIG. 1, and in other embodiments discussed herein, comprises any number of cavitation induces, now known or hereinafter devised, which are suitably configured to induce and/or facilitate hydrodynamic cavitation. For example, cavitation inducers can comprise moving/rotating orifice plates, multi-hole cylindrical or conical rotors, or other moving objects to effect cavitation. In various embodiments, orifice plates, multi-hole cylindrical or conical rotors can include any number of appropriately sized holes (orifices) on the moving/rotating elements for the desired cavitation. For example, several orifice plates may be arranged circumferentially around a central rotating axis (e.g. in a Ferris wheel configuration), with each plate facing the axis of rotation or fixed at any angle. A pair of appropriately sized perforated cylinders may be nested together such that they can both rotate on the same axis. Similarly, a pair of appropriately sized and nested perforated cones may be used for hydrodynamic cavitation. Each member within a pair of nested cylinders or nested cones can be rotated in the same or in opposite directions. Any number of appropriately sized cones or cylinders may be nested together in any combination, (e.g. a perforated cone can be nested inside a larger perforated cylinder, or vice versa). In a dynamic flow process, the flowstream to be subjected to hydrodynamic cavitation may be directed into the larger ends of nested rotating cones and directed out from the smaller diameter ends, or vice versa. In various embodiments, the flowstream may be centrally fed into the axis of the rotating cavitation inducers or into the face of the rotating inducers. The intensity of the hydrodynamic cavitation created by the movement of cavitation inducers in a liquid media depends on a number of variables, including the shape and dimensions of the inducer(s), the number and size of the holes in the inducer(s), the number, combination and arrangement of inducers, the speed at which the inducer(s) is/are moved and/or rotated, the direction of flow into and/or across the inducers, the pressure on the expansion side of the inducer(s), the vapor pressure of the liquid, the composition of the liquid, the velocity of the composition through the holes in the inducer(s), amongst other variables. These variables are optimized for a particular feedstock, knowing the nature of the material(s) to be purified and the contaminant(s) to be removed. An example of perforated rotors usable in various embodiments of the present methods for hydrodynamic cavitation is illustrated in FIGS. 2 and 3 of U.S. Pat. No. 6,596,178 (Archibald, et al.).

Referring now to FIG. 2, an exemplary embodiment of a purification method in accordance with the present disclosure comprises filtration 201 and distillation 205. Either or both of these purification steps may be optionally included in the methods depending on the nature of the material(s) to be purified and the contaminant(s) to be removed. The embodiment in FIG. 2 comprises sequential oxidative sonoelectrolysis with microwave irradiation 203 and reductive sonoelectrolysis with microwave irradiation 204, discussed in more detail below. These sonoelectrolysis steps may be reversed in sequential order, and each may be repeated as many times as necessary to achieve a desired result. Either may be eliminated (e.g. bypassed) depending on the feedstock or the desired result.

The filtration 201 can be configured to reduce the amount of suspended solids in a flowstream. As such, filtration can be included in a purification method designed for the purification of a liquid such as water. Filtration media (or "filters") usable for this step can have anywhere from micron up to centimeter sized pores and can comprise materials such as screens, paper, porous plastic, sintered glass, silica, diatomaceous earth, sand, and the like. Any number of filters can be used, such as filters stacked in decreasing size porosity. For contaminated water, filtration that reduces the total dissolved solids (TDS) to less than about 10 grams/liter at particle sizes on the order of microns will result in turbid, briny water at any pH and any temperature. Such filtered water can then be used for the next step in the purification method, such as hydrodynamic cavitation. Feedstock can be pulled or pushed through various filtration media using appropriately configured and positioned pumps.

With continued reference to FIG. 2, distillation 205 can comprise liquid/vapor distillation, brought about by steam boiling at any atmospheric pressure necessary to desalinate or otherwise separate salts and other non-volatile solids from the liquid, such as water, to be purified. The heating can be achieved by any means such as, for example, a gas flame, an electrical resistive heating element, or by solar or geothermal means.

The method illustrated in FIG. 2 further comprises oxidative sonoelectrolysis with microwave irradiation 203. For this step, a portion of pipeline, or a holding chamber, can include an ultrasonic transducer or other sonic wave source, a magnetron or other microwave source, and an oxidizing electrode or a positive (+) potential applied to the pipe or chamber. In various embodiments, two or more electrodes can be used in a section of pipeline or in an acoustic cavitation vessel to promote oxidation reactions. Additionally, oxygen, ozone, or various peroxide compounds can be introduced at or near the source of ultrasonic waves, and/or at or near an electrode or point of (+) potential. This step targets electron-rich substances that may be present in a feedstock to be purified. Sufficient electrical voltage (V) at variable amperage (A) is applied, with both depending on the pH and conductivity of the flowstream to be treated. The magnitudes of (V) and (A) are empirical quantities based on the sample treated, and will vary from sample to sample. Various ranges for (V) and (A) are recited above. In various embodiments, these parameters can be automatically set based on measurements of the feedstock (e.g. with an immersed probe) and a computer program to calculate and set the values for (V) and (A) required in the sonoelectrolysis. In this case, a controller can set (V) and (A) for the sonoelectrolysis based on a monitoring of the flowstream anywhere upstream from the sonoelectrolysis step. Such monitoring of the flowstream can be continuous or intermittent as needed. In various embodiments, measurement of the flowstream can be taken and then the required (V) and (A) values manually calculated and adjusted. Depending on (V), (A), the types and number of probes, the flowstream composition, and added oxidants, a vent and/or gas collection system can be provided for gasses produced in the sonoelectrolysis step. These gases may be useful commercial products, such as for example, hydrogen (H2), oxygen (O2), or other gasses.

The method illustrated in FIG. 2 also comprises the step of oxidative sonoelectrolysis with microwave irradiation 203. Microwaves act as high frequency electric fields and will generally heat any material containing mobile electric charges, such as polar molecules in a solvent, or conducting ions in a solid. Polar liquids, such as water, are heated as their component molecules are forced to rotate with the field and lose energy in collisions. The water dipole attempts to continuously reorient with the oscillating electric field of the EM radiation. Depending on the frequency, the dipole may move in time to the field, lag behind it, or remain apparently unaffected. When the dipole lags behind the field, then interactions between the dipole and the field lead to an energy loss by heating, the extent of which is dependent on the phase difference of these fields; heating induced thus being maximal twice in each cycle. The ease of the dipole movement depends on the viscosity and the mobility of the electron clouds. In water, these in turn, depend on the strength and extent of the hydrogen bonded network. In free liquid water this dipole movement occurs at GHz frequencies (microwaves) whereas in more restricted 'bound' water, it occurs at MHz frequencies (short radio waves), and in ice at kHz frequencies (long radio waves). Microwave effects include induced rotation of dipoles (e.g. at rotation speeds of approximately 5×109 Hz) and fast heating up to about 10° C./sec. Microwave heating is able to heat target compounds without heating the entire container (tank, pipe, etc.), thereby saving time and energy. Microwaves are also able to heat sufficiently thin objects throughout their volume, rather than first through an outer surface as in conductive heating. Thus microwave heating is likely to be a more uniform heating method. Microwave heating can further break down molecules and materials by reaction rate acceleration under milder reaction conditions, producing higher chemical yield with lower energy usage. In various embodiments, the microwave irradiation can be in a steady-flow operation or in a unit/batch process.

When cavitation is combined with microwave irradiation, more intense conditions can be created within the confines of the acoustic cavitation bubbles, regardless if the cavitation is inertial or non-inertial, and regardless of the presence of oxidative or reductive electrolysis contemporaneous with the cavitation. As discussed above, the interior of collapsing cavitation bubbles in inertial cavitation can reach temperatures of thousands of degrees Kelvin and pressures of several hundred Atmospheres. Microwave irradiation focuses into cavitation bubbles where the radiation locally heats the vapors present therein, accelerating chemical reactions and promoting otherwise unachievable chemical reactions. Likewise, in non-inertial cavitation, acoustic cavitation bubbles oscillating in size or shape can be heated by microwave radiation to temperatures that promote and accelerate various chemical reactions. In acoustic cavitation, cavitation bubbles contain a "sonoplasma," which can be heated by the microwave irradiation in accordance with the present disclosure.

With continued reference to FIG. 2, various embodiments of the methods can further comprise the step of reductive sonoelectrolysis with microwave irradiation 204. For this step, a portion of pipeline, or a chamber, can include an ultrasonic transducer or other sonic wave source, a magnetron or other microwave source, and a reducing electrode or a negative (−) potential applied to the pipe or chamber. In various embodiments, two or more electrodes can be used in a section of pipeline or in an acoustic cavitation vessel to promote reduction reactions. Additionally, sulfites, CO, or H2 can be introduced at or near the source of ultrasonic waves, and/or at or near an electrode or point of (−) potential. This step targets electron-poor substances that may be present in a feedstock to be purified. The contemporaneous microwave irradiation operates in this step as described above in the oxidative sonoelectrolysis step. That is, the microwaves heat the sonoplasma present in the acoustic cavitation bubbles to temperatures sufficient to promote and accelerate chemical reactions that degrade and/or destroy unwanted substances. For example, reductive sonoelectrolysis in the presence of microwave irradiation can de-chlorinate various chlorinated organic chemicals when the source of electrons is a graphite or glassy carbon electrode. In various embodiments of the present methods, chlorinated species such as certain pesticides can be destroyed in a water purification process. As discussed above for oxidative sonoelectrolysis, the voltage (V) and amperage (A) can be manually set, or automatically changed by a controller depending on a dynamic sampling of the feedstream entering this step of the purification method.

Referring now to FIG. 3, an exemplary system 300 usable for the purification of a feedstock is illustrated. The system 300 comprises various devices suitably configured to carry out the methods of the present disclosure. Each device can be configured with the components necessary for the device to provide one or more purification steps. Devices in accordance with the systems of the present disclosure can comprise a section of pipeline, a vessel, a chamber, a reactor, or the like, wherein the associated purification steps occurs. The exemplary system 300 comprises a hydrodynamic cavitation device, a microwave irradiation device, and at least one of an oxidative sonoelectrolysis and reductive sonoelectrolysis device. As mentioned, in various embodiments, the individual purification steps may be carried out in any section of pipeline, in a section of pipeline having a larger cross-sectional area than the inlet and/or outlet pipelines, or in a chamber, reactor or other suitable vessel having pipelines entering and exiting a larger housing. In various embodiments, it may not be visible to a casual observer that a particular section of ordinary looking pipeline comprises a purification device, other than perhaps the presence of electrical leads or other connections to that particular section of pipeline that indicate a section of pipeline is configured as a purification device.

In FIG. 3, the straight lines connecting the various devices in system 300 represent pipeline configured to move a flowstream. In various embodiments, pipeline can comprise metal, plastic or other materials suitable for the methods and systems of the present disclosure. The pipelines can comprise any cross-sectional shape (e.g. circular) and size necessary for moving a flowstream through the methods and systems of the present disclosure.

As illustrated, feedstock storage unit 302 contains and supplies feedstock to be purified by various embodiments of the present methods. As discussed, the feedstock comprises material(s) that undergo compositional changes when subjected to the purification methods of the present disclosure. Pump 303, located in-line in the system 300, can be used to move the flowstream throughout the system 300. Additional pumps may be positioned as needed anywhere in system 300. Filter 304 is optionally used to remove suspended solids, and it can comprise filtration materials as discussed above. Any number of filters may be employed for filtration. Junction 305 and valve 306 can be provided as shown in the pipelines, and can be placed in any other positions in the system 300 as needed to direct the course of the flowstream. In various embodiments, a change in direction of the flowstream may be used to reroute a flowstream repeatedly through a particular purification device until the desired outcome is achieved. Flowstream may also be temporarily held in a larger chamber or within a closed-off section of pipeline while a batch operation is performed on the flowstream.

System 300 further comprises a hydrodynamic cavitation device 307, which comprises any number of suitably configured cavitation inducers now known or hereinafter discovered capable of inducing and/or facilitating hydrodynamic cavitation of the flowstream. For example, hydrodynamic cavitation device 307 can comprise cavitation inducers in the form of orifice plates, multi-holed cylinders, and/or multi-holed cones, as discussed above. A motor may be used to move/rotate the cavitation inducers. The motor may be connected to any AC or DC power source, or to any other power source sufficient to operate the motor. In this way, the flowstream can be subjected to sufficient hydrodynamic cavitation within the hydrodynamic cavitation device 307 such that large molecular weight substances are broken down into smaller subunits for ease of removal in subsequent steps. For example, waxes, oils, greases, hydrocarbons, lipids, organisms, cells, organelles, proteins, polypeptides, polysaccharides, and DNA, and the like, can be sheared up into smaller subunits during the hydrodynamic cavitation process.

Following hydrodynamic cavitation, a microwave device 308 can be used to irradiate the flowstream with microwave radiation as illustrated in FIG. 3. The microwave device 308 can comprise any source of microwaves, such as for example a magnetron, klystron, traveling-wave tube, gyrotron, field-effect transistor, tunnel diode, Gunn diode or IMPATT diode, as discussed above. In various embodiments, a magnetron may be placed on or in a section of pipeline to irradiate the flowstream with microwaves as it passes through a zone in the pipeline proximate to the source of microwaves.

Following microwave irradiation, the flowstream then enters a first acoustic cavitation and electrolysis device 309 where the flowstream is subjected to oxidative sonoelectrolysis. For this purpose, an ultrasonic transducer 310a may be attached to, or inserted into, device 309. Additionally, at least one positive (+) electrode 311a can be provided as a sink for electrons. The electrode 311a may provide for a galvanic half-cell electrochemical reaction in the flowstream within device 309, and as such, may be accompanied by any number of additional electrodes positioned in proximity to, or separate from, the first device 309. The device 309 may further comprise an inlet port configured for the introduction of oxidants in the form of ionic solutions or gasses. In various embodiments, first device 309 may further comprise an outlet for venting any gasses formed during the oxidative sonoelectrolysis of the flowstream.

As shown in FIG. 3, the flowstream may be routed around first device 309, or alternatively, the flowstream output from first device 309 may be routed into second acoustic cavitation and electrolysis device 312, wherein the flowstream is subjected to reductive sonoelectrolysis. For this purpose, an ultrasonic transducer 310b may be attached to, or inserted into, device 312. Additionally, at least one negative (−) electrode 311b can be provided as a source of electrons. The negative (−) electrode 311b may provide for a galvanic half-cell electrochemical reaction in the flowstream within second device 312, and as such, may be accompanied by any number of additional electrodes positioned in proximity to, or separate from, the second device 312. In various embodiments, the positive (+) electrode 311a from first device 309 and the negative (−) electrode 311b from second device 312 can be connected to opposite poles of a common DC power source to create an overall galvanic cell. As above, second device 312 may further comprise an inlet port for introduction of reducing agents, and an outlet for any off-gasses produced during the reductive sonoelectrolysis.

As further shown in FIG. 3, system 300 may include a distiller 313 that can be used to separate the remaining solids from the flowstream by distillation to produce the final product stream that is held as needed in product stream storage 315. The solids or brine may be held in the brine and/or solids tank 314 as needed. Distiller 313 and solids tank 314 are optional, depending on the nature of the feedstock and the material(s) to be purified. As discussed, the product stream comprises the material(s) compositionally changed by passage through the system 300.

Figure 4:
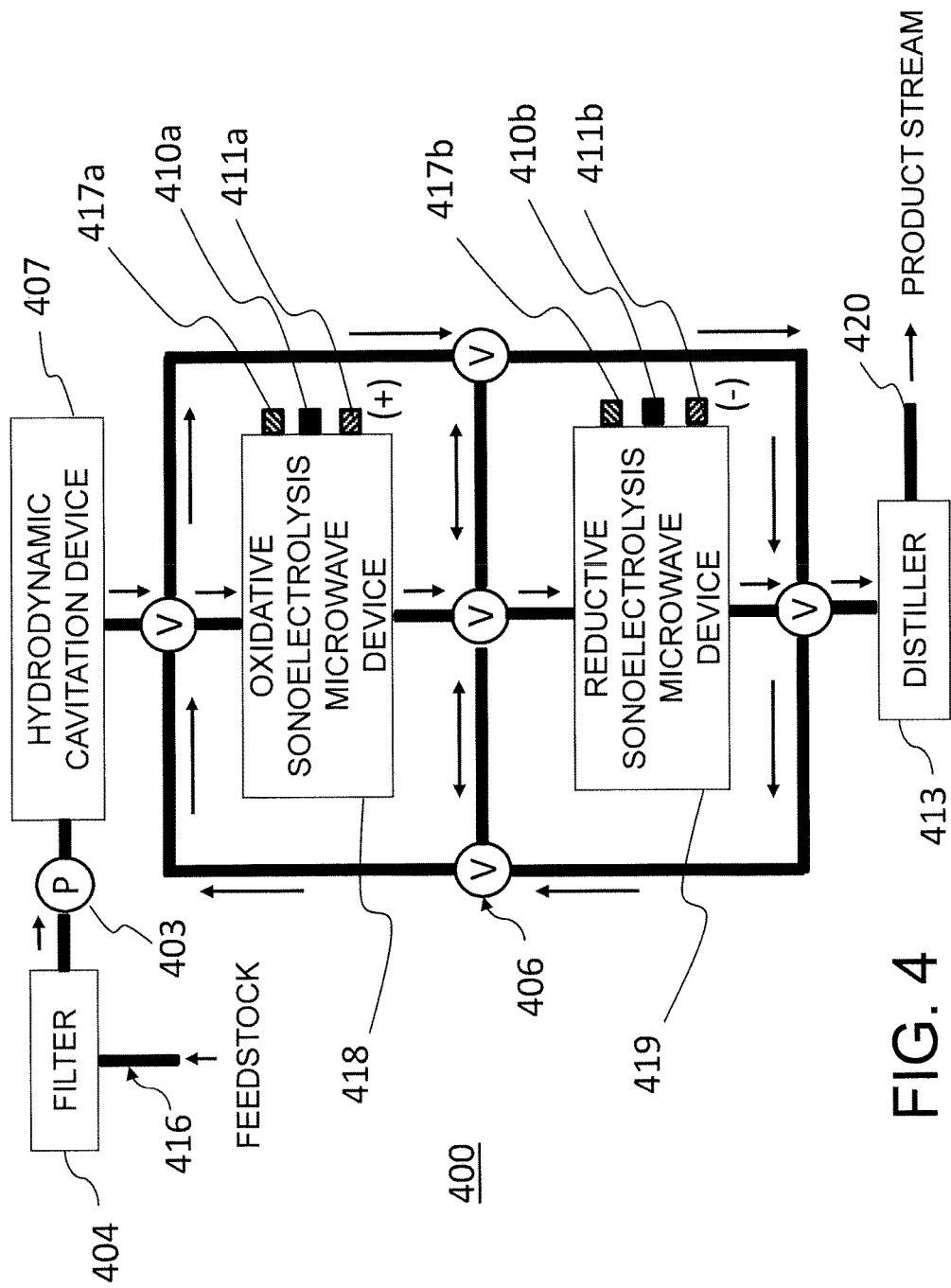
FIG. 4 illustrates another embodiment of a purification system in accordance with the present disclosure.

Referring now to FIG. 4, another exemplary embodiment of a purification system 400 is illustrated. Some elements common to the system 300 of FIG. 3 are discussed in detail above and not repeated here for the sake of brevity. These elements include filter 404, pump 403, hydrodynamic cavitation device 407, valve 406, and distiller 413. As shown, various valves and pipelines can be connected such that individual devices can be bypassed or repeated as necessary for a particular feedstock. The inlet into system 400 is pipeline 416, through which the feedstock enters the purification system. The feedstock comprises at least one material to be purified through the present system 400.

After filtration and hydrodynamic cavitation in device 407 to remove and shear larger impurities, the flowstream then enters oxidative sonoelectrolysis microwave device 418. Device 418 further comprises magnetron 417a, or any other suitable microwave radiation source, transducer 410a, or any other suitable source of acoustic energy, and positive (+) electrode 411a. As discussed, (+) electrode 411a may comprise a portion of metal pipeline impressed with a positive (+) electrical potential, a strip of any metal attached to a portion of plastic pipeline and impressed with a positive (+) potential, or any type of electrode, such as for example, a boron doped diamond (BDD) electrode. With device 418 suitably configured with these three elements, the flowstream within the device 418 can be subjected to contemporaneous acoustic cavitation, electrolysis and microwave irradiation under oxidizing conditions. These combined processes operate to destroy contaminants present in the flowstream, thus further purifying materials therein. The acoustic cavitation can produce both inertial and non-inertial cavitation depending on the sonication conditions, and can also produce oxidizing species such as hydroxyl radicals. Furthermore, oxidizing agents such as oxygen, ozone or peroxides can be added into this device of the system 400. The collapsing cavitation bubbles can achieve very high internal temperatures and pressures that accelerate vapor-phase chemical reactions within each bubble. Smaller molecular weight subunits, which were the products of the hydrodynamic cavitation step, can now be sufficiently volatile to vaporize into the cavitation bubbles for ultimate destruction. The electrolysis facilitates electrochemical reactions to further destroy organic materials such as chlorinated species. Additionally, the microwave radiation can heat the sonoplasma present in the cavitation bubbles to promote and accelerate vapor-phase chemical and electrochemical reactions. The overall result of this contemporaneous sonication, electrolysis and irradiation is the destruction of unwanted contaminants rather than separation of contaminants requiring later disposal.

With continued reference to FIG. 4, after oxidative sonoelectrolysis and microwave irradiation, the flowstream can be directed into reductive sonoelectrolysis microwave device 419. Device 419 further comprises magnetron 417b, or any other suitable microwave radiation source, transducer 410b, or any other suitable source of acoustic energy, and negative (−) electrode 411b. As discussed, (−) electrode 411b may comprise a portion of metal pipeline impressed with a negative (−) electrical potential, a strip of any metal attached to a portion of plastic pipeline and impressed with a negative (−) potential, or any type of electrode, such as for example, a graphite or glassy carbon electrode. With device 419 suitably configured with these three elements, the flowstream within the device can be subjected to contemporaneous acoustic cavitation, electrolysis and microwave irradiation under reducing conditions. These combined processes operate to destroy contaminants present in the flowstream, thus further purifying materials therein as discussed above. Reducing agents such as sulfites or H2 can be added into this device of the system 400. The collapsing cavitation bubbles can achieve very high internal temperatures and pressures that accelerate vapor-phase chemical reactions within each bubble. The overall result of this contemporaneous sonication, electrolysis and irradiation under reducing conditions is the destruction of unwanted contaminants rather than separation of contaminants requiring later disposal.

The system 400 illustrated in FIG. 4 operates to produce a product stream from outlet pipe 420, which comprises compositionally changed material relative to the feedstock. As discussed, the feedstock contains material(s) to be purified, and comprises at least one of water, fluids, mineral ore, sand, and mineral deposits. The material contained within the product stream is different compositionally than the material beginning in the feedstock. For example, polluted water may be the impure feedstock entering the system 400, whereas the product stream exiting the system 400 may comprise potable water representing greater than approximately 80% purification of the beginning water, if not greater than approximately 90% in some instances.

Figure 5:
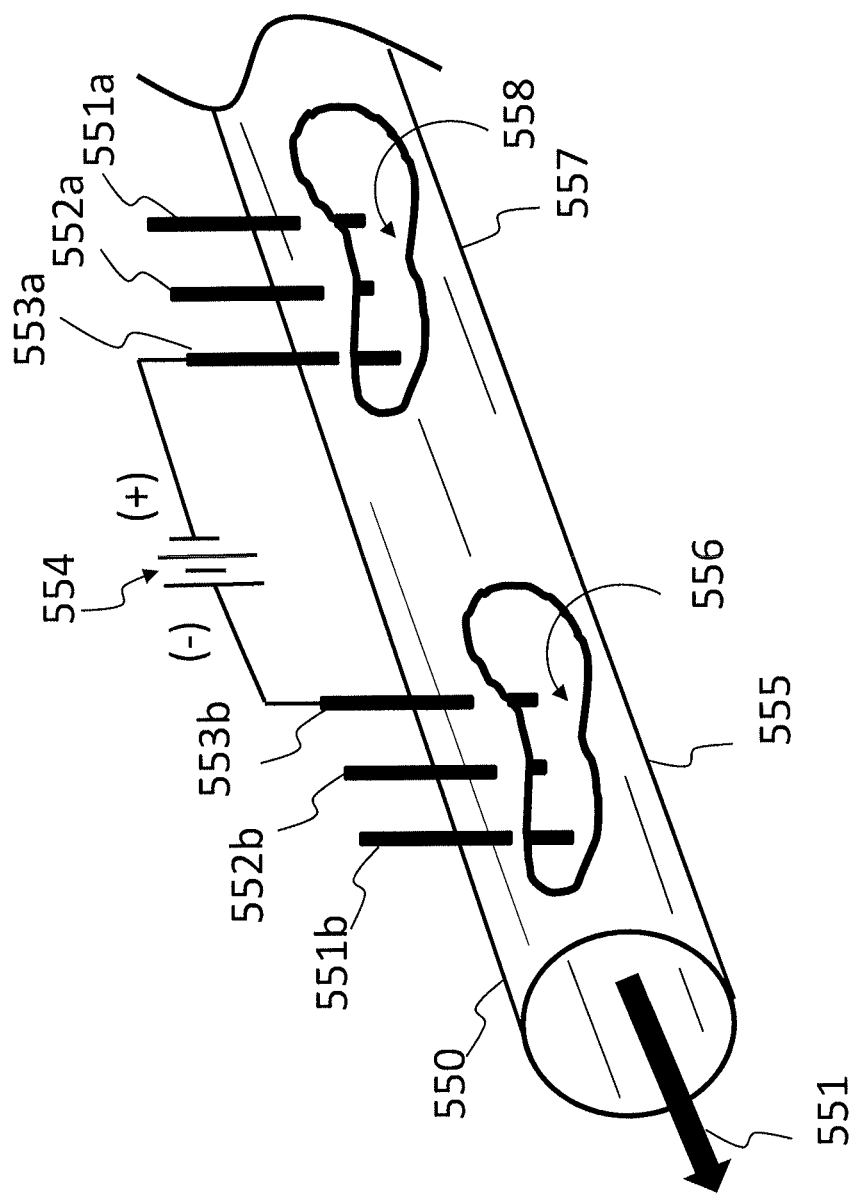
FIG. 5 illustrates an embodiment of dynamic sequential oxidative and reductive sonoelectrolysis with microwave irradiation in a pipeline in accordance with the present disclosure.

With reference now to FIG. 5, a dynamic flow system comprising both oxidative and reductive sonoelectrolysis with contemporaneous microwave irradiation is illustrated. This section of pipeline can be a part of any of the methods and systems disclosed herein, such as for example, a portion of system 300 in FIG. 3 or system 400 in FIG. 4. Here, a section of pipeline 550 can operate as a conduit for a flowstream 551 that comprises at least one material to be purified by operation of sequential oxidative sonoelectrolysis and reductive sonoelectrolysis, each with contemporaneous microwave irradiation. As illustrated, first section 557 of the pipeline 550 operates as an oxidative sonoelectrolysis device. Inside the pipeline at first section 557 is a first reaction zone 558 wherein oxidative sonoelectrolysis with microwave irradiation operates on the flowstream 551. For this purpose, a magnetron 551a or other microwave source can be configured in the pipeline 550. Proximate to the magnetron 551a, a transducer 552a or other ultrasonic source can be provided. Additionally, a first electrode 553a can be provided in the pipeline 550, proximate to both the magnetron 551a and the transducer 552a.

Similarly, and further downstream along the pipeline 550 at second section 555, a second reaction zone 556 can be provided wherein reductive sonoelectrolysis with microwave irradiation operates on flowstream 551. As illustrated, second section 555 of the pipeline 550 operates as a reductive sonoelectrolysis device. For this purpose, a magnetron 551b or other microwave source can be configured in the pipeline 550. Proximate to the magnetron 551b, a transducer 552b or other ultrasound source can be provided. Additionally, a second electrode 553b can be provided in the pipeline 550 proximate to both the magnetron 551b and the transducer 552b.

A DC source 554, such as a battery or a rectifier, can be connected to both the first electrode 553a and the second electrode 553b. First electrode 553a can be connected to the (+) side of the DC source to operate as the cathode in the electrolytic cell present within the pipeline 550. Second electrode 553b can be connected to the (−) side of the DC source to operate as the anode in the electrolytic cell present within the pipeline 550. In this way, flowstream 551 can be subjected to sequential oxidative and reductive sonoelectrolysis in the presence of microwave irradiation by passing through first section 557 and second section 555 of the pipeline 550. Variations of this configuration are within the scope of the present invention. For example, additional electrodes may be added, one or more being remote to the pipeline 550 and sacrificial. In various embodiments, only one magnetron may suffice to irradiate both sonoelectrolysis regions of the pipeline 550, rather than using two separate microwave sources. Additionally only one ultrasonic transducer may suffice for both oxidative and reductive sonoelectrolysis steps. In various embodiments, there may be any length of pipeline 550 separating the individual steps of oxidative and reductive sonoelectrolysis, and various valves and additional pipeline can be used to provide for routing of the flowstream 551 around one of the steps, and/or repeatedly back through a step.

Uses of the Purification Methods of the Present Disclosure

Having disclosed various methods and systems, the application of such methods and systems can be appreciated in various industrial and commercial contexts as set out herein below:

I. Purification of Water

1. Purification of Water Polluted in the Course of Industrial Operations:

In the United States, industry is the greatest source of pollution, accounting for more than half the volume of all water pollution and for the most deadly pollutants. Some 370,000 manufacturing facilities use huge quantities of freshwater to carry away wastes of many kinds. The waste-bearing water, or effluent, is discharged into streams, lakes, or oceans, which in turn disperse the polluting substances. In its National Water Quality Inventory, reported to Congress in 1996, the U.S. Environmental Protection Agency concluded that approximately 40% of the nation's surveyed lakes, rivers, and estuaries were too polluted for such basic uses as drinking supply, fishing, and swimming. The pollutants include grit, asbestos, phosphates and nitrates, mercury, lead, caustic soda and other sodium compounds, sulfur and sulfuric acid, oils, and petrochemicals. In addition, numerous manufacturing plants pour off undiluted corrosives, poisons, and other noxious byproducts. The construction industry discharges slurries of gypsum, cement, abrasives, metals, and poisonous solvents. Other industrial contaminants having a risk of entering the food chain include polychlorinated biphenyl (PCB) compounds, components of lubricants, plastics, and adhesives.

The purification methods disclosed herein find use in the purification of water contaminated from these, and other, industrial operations. For example, purification methods in accordance with the present disclosure can be used to remove and/or destroy the following contaminants present in a feedstock of industrial water: grit, gypsum, cement, abrasives, asbestos, phosphates, nitrates, mercury, lead, sodium hydroxide and other sodium compounds, sulfur, sulfuric acid, oils, petrochemicals, corrosives, poisons, metals, poisonous solvents and PCB's. In various embodiments, the present purification methods can be used to produce at least 80% pure water from water contaminated through these and other industrial operations.

2. Purification of Water Contaminated in the Course of Mining Operations:

There are four major types of contamination to water as a result of mining operations: 1) acids, from mine drainage; 2) heavy metal contamination from leaching; 3) processing chemicals from general operations; and 4) inorganic said and other abrasives from erosion and sedimentation. In various embodiments, the present purification methods can be used to produce at least 80% pure water from water contaminated through these and other mining operations.

The purification methods disclosed herein can be used in the purification of water contaminated from these and other mining operations. For example, purification methods in accordance with the present disclosure can be used to remove and/or destroy acids, heavy metals, processing chemicals, and inorganics sediments present in a feedstock of contaminated water from mining operations. In various embodiments, the present purification methods can be used to produce at least 80% pure water from water contaminated through these and other mining operations 3. Purification of Water Contaminated in the Course of Gas Fracking Operations:

As an example of the composition of water contaminated in the course of various induced hydrolytic fracturing operations, data from the Fayetteville Shale extractions show the fracking fluid (i.e. contaminated water) to comprise 90% water, 9% proppant (sand, ceramics, sintered bauxite, and the like), and less than about 0.5% of a mixture of chemicals including: 0.123% hydrochloric acid; 0.01% peroxydisulfates; 0.001% gluteraldehyde and 2-bromo-2-nitro-1,2-propanediol bactericides; 0.06% tetramethyl ammonium chloride, potassium chloride, and other salts; 0.002% methanol; 0.007% potassium hydroxide; 0.088% sodium acrylate/acrylamide copolymer and polyacrylamide (PAM); 0.056% guar gum; 0.004% citric acid, thioglycolic acid, and other chelants; 0.043% ammonium chloride, ethylene glycol, and polyacrylate scale control agents; and 0.085% surfactants.

The purification methods disclosed herein can be used in the purification of water contaminated from these and other induced hydrolytic fracturing operations. For example, purification methods in accordance with the present disclosure can be used to remove and/or destroy the following contaminants present in a feedstock of fracking fluid: sand, ceramics, sintered bauxite, acids, alkalis, alcohols, solvents, surfactants, gelling agents, peroxy compounds, synthetic polymers and copolymers, scale control agents, iron chelants, salts, biocides, and corrosion inhibitors. In various embodiments, the present purification methods can be used to produce at least 80% purification of water contaminated through these and other induced hydrolytic fracturing operations.

4. Purification of Water Contaminated in the Course of Energy Production:

During the course of energy production, water is polluted more than just thermally. For example, in boiler blowdown, a water waste stream results from periodic purging of the impurities that become concentrated in steam boiler systems. These pollutants include metals such as copper, iron and nickel, as well as chemicals added to prevent scaling and corrosion of steam generator components. In coal pile runoff, a water waste stream is created when water comes in contact with coal storage piles maintained on the power plant site. While most piles are kept covered, active piles used to meet the power plants' immediate needs are often open to the elements. Metals and other naturally occurring contaminants contained in coal leach out with rainfall and are deposited in nearby water bodies. In cooling processes, the water used for power plant cooling is chemically altered for purposes of extending the useful life of equipment and to ensure efficient operation. Demineralized regenerants and rinses are chemicals employed to purify waters used as makeup water for the plant's cooling system. Cooling tower blowdown contains chemicals added to prevent biological growth in the towers and to prevent corrosion in condensers, (e.g. Cr(VI) and Cr(III) compounds). In boiler operations, wastes derive from the chemical additives intended to remove scale and other byproducts of combustion. In summary, a variety of metallic, chemical, and biocide pollutants are found in water used for various purposes in energy production.

The purification methods disclosed herein can be used in the purification of water contaminated from these and other types of energy production. For example, purification methods in accordance with the present disclosure can be used to remove and/or destroy the following contaminants present in a feedstock of water waste streams from energy generation: Cr(III) compounds, Cr(VI) compounds, Cu, Fe, and Ni (each elemental or in various oxidation states), scale control agents, biocides, and corrosion inhibitors. In various embodiments, the present purification methods can be used to produce at least 80% purification of water contaminated through these and other forms of energy production.

5. Purification of Water Contaminated in the Course of Agricultural Operations:

One of the leading causes of water pollution in the United States today is agriculture. Pollutants in water from agricultural operations include, for example, ammonia, nitrates, phosphates, pathogens, antibiotics, metals, heavy metals, and organic matter. In the 2000 National Water Quality Inventory conducted by the Environmental Protection Agency (EPA), agricultural activity was identified as a source of pollution for 48% of stream and river water, and for 41% of lake water.

The purification methods disclosed herein can be used in the purification of water contaminated from agricultural operations. For example, purification methods in accordance with the present disclosure can be used to remove and/or destroy the following contaminants present in a feedstock comprising agricultural water: ammonia, nitrates, phosphates, pathogens, antibiotics, metals, heavy metals, and organic matter, amongst others. In various embodiments, the present purification methods can be used to produce at least 80% purification of water contaminated through agriculture.

II. Purification of Minerals

1. Purification of Elemental Metals Present in Mineral Ore, Sand, and Mineral Deposits:

The purification methods disclosed herein can be used in the purification of elemental metals. The feedstock for the present method includes, for example, mineral ore, sand, and mineral deposits. For example, gold ore may comprise rock dispersed with elemental gold. In various embodiments, a feedstock comprising porphyry deposits can be treated with the present methods to obtain elemental copper. In general, the present methods can be used to produce purified Ag, Au, Cu, Al, Si, and Ni from various mineral ores, sands, and mineral deposits. In general, the methods of the present disclosure can be used to separate rare earth elements. The starting ore, sand or deposit can be ground to about 100 mesh, and then combined with water or other suitable carrier liquid to form feedstock slurry. The slurry can then enter the first step of the purification method as feedstock for the method, as discussed above.

2. Purification of Metallic Compounds Present in Mineral Ore, Sand, and Deposits:

The purification methods disclosed herein can be used in the purification of metallic compounds. The feedstock for the present method includes, for example, mineral ore, sand, and mineral deposits. For example, copper pyrites can be subjected to the present method to produce purified copper (II) sulfate. In general, the present methods can be used to produce, for example, the (I) through (VIII) stable oxidation compounds known for Mg, Li, Al, Si, Ti, Mn, Fe, Co, Ni, Cu, Zn, Se, Mo, Au, Ag, Pd, Pt, W, Zr, Cd, and the like, from various mineral ores, sands, and mineral deposits. The starting ore, sand or deposit can be ground to about 100 mesh, and then combined with water or other suitable carrier liquid to form feedstock slurry. The slurry can then enter the first step of the purification method as feedstock for the method, as discussed above.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

What is claimed is:

1. A method of purifying a feedstock, said method comprising:
    (a) providing a feedstock comprising at least one material to be purified; and,
    (b) exposing said feedstock to the discrete steps of:
        1) hydrodynamic cavitation;
        2) simultaneous oxidative sonoelectrolysis and microwave radiation; and
        3) simultaneous reductive sonoelectrolysis and microwave radiation;
    wherein the step 1) precedes both steps 2) and 3), and
    wherein said method produces a product stream comprising the material compositionally changed relative to said feedstock.

2. The method of claim 1, wherein the step 2) precedes the step 3).

3. The method of claim 1, wherein said feedstock comprises at least one of contaminated water, a fluid, a mineral ore, sand, or a mineral deposit.

4. The method of claim 1, wherein said feedstock comprises contaminated water and said compositionally changed material comprises potable water.

5. The method of claim 1, wherein said feedstock comprises a mineral ore and said compositionally changed material comprises at least one pure metallic element.

6. The method of claim 5, wherein the mineral ore is crushed and/or ground to a particular particle size and suspended in a liquid carrier to form said feedstock.

7. The method of claim 6, wherein said at least one pure metallic element is chosen from the group consisting of Ag, Au, Cu, Al, Si, Ni, and mixtures thereof.

8. The method of claim 1, wherein the step 3) precedes the step 2).

* * * * *